March 5, 1929.  C. T. RAY  1,704,339
HARROW
Filed Dec. 15, 1919  8 Sheets-Sheet 2

March 5, 1929.  C. T. RAY  1,704,339
HARROW
Filed Dec. 15, 1919   8 Sheets-Sheet 4

Inventor
Charles T. Ray,

By   C. J. Stickman
Attorney

March 5, 1929.  C. T. RAY  1,704,339
HARROW
Filed Dec. 15, 1919  8 Sheets-Sheet 5

Inven.
Charles T. Ray,
By C. J. Stockman
Attorney

March 5, 1929.  C. T. RAY  1,704,339
HARROW
Filed Dec. 15, 1919  8 Sheets-Sheet 8

Inventor
Charles T. Ray,
By C. J. Stackman
Attorney

Patented Mar. 5, 1929.

1,704,339

UNITED STATES PATENT OFFICE.

CHARLES T. RAY, OF LOUISVILLE, KENTUCKY, ASSIGNOR TO B. F. AVERY & SONS, OF LOUISVILLE, KENTUCKY, A CORPORATION OF KENTUCKY.

HARROW.

Application filed December 15, 1919. Serial No. 344,963.

This invention relates to earth working implements of that type in which the earth working members are one or more groups or gangs of disks or the like, upon which the implement travels while the disks are in working position and while the implement is being transported and which members when in working position are arranged in a diagonal relation to the frame and line of draft and when in transport position are parallel to the line of draft.

It more particularly relates to improvements in disk harrows which are intended to be drawn by tractors and which comprise a forward pair of groups or gangs of disks on opposite sides of its longitudinal center and a second pair of groups or gangs of disks arranged behind the forward pair and mounted to swing laterally relatively to the forward pair.

Tractor drawn disk harrows having trailers—i. e. one or more groups or gangs of disks arranged in a trailing relation to the groups or gangs immediately in advance thereof—accordingly, exemplify implements of the class which may comprise all of the features and novel combinations and correlations of parts embodied in the present invention and for that reason an implement of that class has been illustrated and will be hereinafter described in detail, but it will be understood that I do not intend thereby to restrict the invention in all respects to an implement of this particular class as I recognize the fact that some of its features and novel combinations may be embodied in implements of a different style. It is also apparent that many of the details hereinafter described may be changed without departing from the spirit of my invention. Therefore, I would have it understood that the implement particularly illustrated and hereinafter described is merely exemplary.

Inasmuch as the implement travels upon the disks, both when being transported and when harrowing, the difficulty of shifting the disks from their transport position to their working position and from their working position to their transport position, especially in harrows of the heavier or larger type, has been well recognized and it has been proposed to utilize the power of the tractor to accomplish shifting of the disks from one position to another.

One fundamental purpose of the present invention is to provide means of a practicable nature whereby shifting of the gangs from one position to another will be accomplished by power derived from the movement of the harrow itself as contradistinguished from movement of the tractor or other means, outside the harrow, employed to propel the harrow.

Another of the important purposes of this invention is to provide a means of practicable nature whereby the disks may be shifted from transport position to working position and from working position to transport position by power derived from the forward travel of the harrow itself.

In accordance with the foregoing very important purposes, the invention contemplates, broadly, the employment of an appropriate ground engaging member from which power to shift the gangs may be derived when the harrow of which such member forms substantially a part is in motion. This ground engaging member may be of any suitable nature, considering the present invention in its broadest aspects with relation thereto; but it is a further purpose of the invention to provide the most practicable means for shifting the gangs or groups of disks by power derived from the forward movement of the harrow.

In pursuance of the foregoing several purposes, I have provided the harrow with shifting mechanism for the earth working members, which is normally out of operation and in no wise interferes with the earth working operation or retards the movement of the implement, but is under control of the operator through means of such a nature (including a ground engaging element and appropriate connections) that when such means are operated the ground engaging element becomes operable with relation to said connections to effect the shifting of the groups—hereinafter called "gangs"—of disks to transport position if they be in working position and to working position if they be in transport position.

Mechanism for the purpose in view may be variously embodied within the spirit and scope of appended claims, but a still further purpose of my invention is to provide an organization of elements which will have additional advantages in respect of simplicity of construction, durability, and most efficient application of the power for shifting the gangs and these purposes are well subserved by the particular embodiment herein illustrated for which reason the particular illustrated embodiment has been made the subject of claims.

Another important purpose of the invention is to provide a means for applying power to the disk gangs, so organized that it will include elements operable to adjust the gangs to regulate the angles which they will assume when they are shifted.

The accompanying drawings illustrate a two way disk harrow in which the foregoing several purposes are embodied in an advantageous form. In other words the accompanying drawings illustrate a preferred embodiment of means for carrying the foregoing purposes into practical operation. While I have illustrated the preferred embodiment in minute detail and shall describe it somewhat minutely I nevertheless would have it understood that it is merely exemplary and that the invention may be otherwise and variously embodied without departing from its spirit or the scope of appended claims.

In the accompanying drawings illustrating the preferred embodiment of the invention, and wherein like characters of reference denote corresponding parts in the several views:—

Fig. 10 is an enlarged detail view of the lever O and its connections.

A main frame of suitable construction is formed of front and rear members A and B, which preferably are rectangular, as shown, and longitudinal spaced members C, C' which extend forwardly and rearwardly from the member A and have their rear portions arranged in a divergent relation. The members A and C, C' are rigidly secured to each other and constitute a front frame, while the member B is movable toward and away from the member A. D, D' designate draw bars to which the power for drawing the harrow is applied. These are connected to the members C, C' as hereinafter described. The tongue truck $D^2$ may or may not be used as desired. When used it is preferably connected to these draw bars.

Each disk gang comprises a group of disks mounted on an axle whose bearings are carried by an appropriate frame-member, which is pivotally attached to a main frame member so as to be capable of movement upon a vertical axis to shift its group of disks from and into earth working position. More particularly described, this part of the implement herein illustrated for exemplary purposes, comprises a forward pair of members E, E'—called gang frame members—pivotally connected to the main frame member A at $e, e'$, respectively, and provided with suitable bearings in which the axles $F^a$, $F^b$ of the forward gangs of disks, F, F' are mounted: and a rear pair of members G, G'—similarly called gang frame members—pivoted to the rear main frame member B at $g, g'$ and provided with suitable bearings in which the axles $G^a$, $G^b$ of the rear gangs of disks H, H' are journaled.

Figure 1:
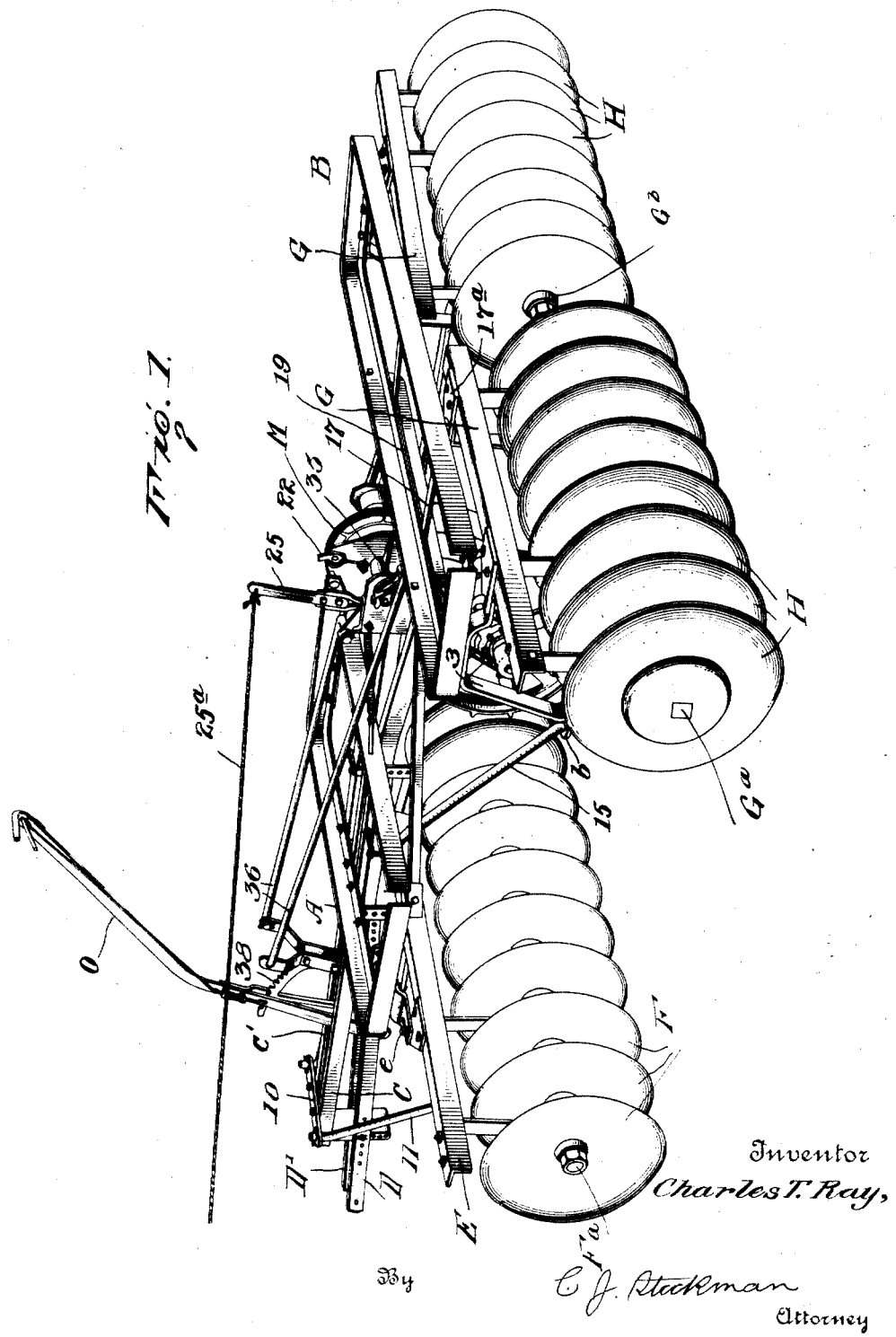
Fig. 1 is a perspective view of a two way disk harrow with the parts in transport position.
Figure 2:
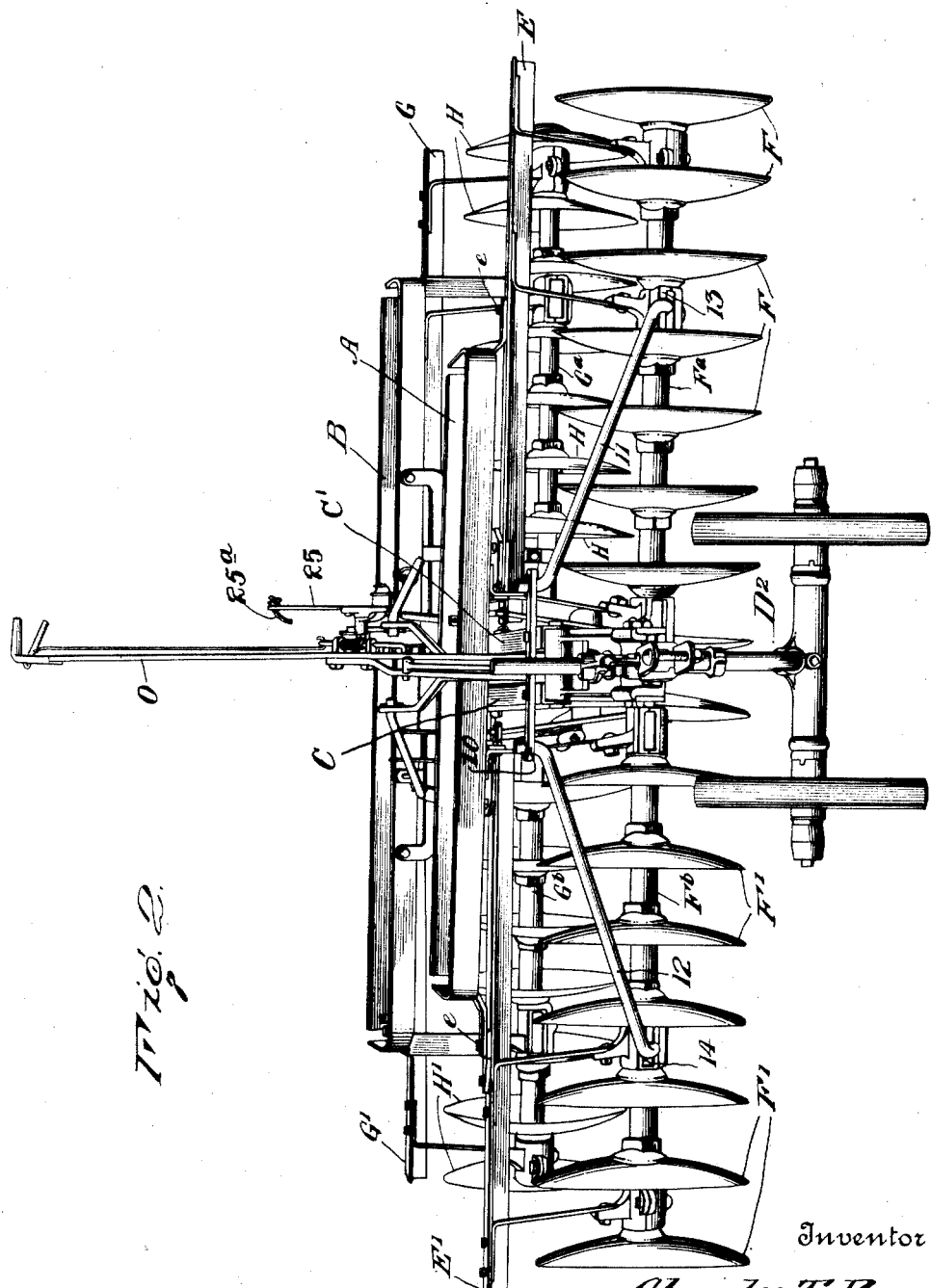
Fig. 2 is a front view of the same, slightly in perspective.

A cross arm 10 is suitably fixed to the frame members C, C' and rods 11, 12 are pivoted to opposite ends of this cross piece at their forward ends. The rear ends of these rods are pivotally connected to lips which extend from axle bearings 13 and 14 at points which are in line vertically with pivots $e$, $e'$ as shown in Fig. 2. These rods brace the forward gangs, which swing on the rear ends of the rods as well as upon the pivots $e$ and $e'$.

Any suitable means may be employed to shift the rear gangs simultaneously with the forward gangs. The particular means illustrated in the accompanying drawings for this purpose comprises links 15 and 16 arranged to connect the inner ends of the forward gang frame members E, E' with the outer ends of the rear main frame member B, and reaches 17 and 18 connecting the inner ends of the rear gang frame members G, G' with a fixed part of the forward main frame. As here shown, the forward ends of the reaches 17 and 18 are attached to ears $c$, $c'$ fixed to the rear ends of the members C, C' and the rear ends of the links 15 and 16 are pivoted to lips $b$, $b'$, projecting forwardly from brackets 3 and 3', which brackets comprise upper members fixedly secured to the main frame member B and lower members connected to the rear gangs by pivots $g^2$, $g^3$ located vertically in line with the pivots $g$, $g'$. Moreover, in this particular exemplification of the invention each reach bar 17 and 18 is formed of an upper member and a lower member. The upper members are pivoted at their rear ends to brackets ($17^a$, $18^a$) at the inner ends of the respective gang frame members (G, G') and the lower members of the reaches are pivoted to lips (not shown) projecting from a contiguous axle bearing. The pivots $e$, $e'$ about which the respective gang frame members E, E' swing are mounted to traverse slots $e^2$, $e^3$ in brackets $a$, $a'$ carried by the forward main frame member A and the reaches 17 and 18 extend through an opening 19 on the forward side of the main frame member B. The links 15 and 16 are preferably connected to the gang frame members E and E' through the medium of corner plates $15^a$ and $16^a$ attached to said gang frame members and having a plurality of openings any one of which is adapted to receive the end of the corresponding link whereby this connection is pivotal and adjustable.

It will be noted that if force be applied in a rearward direction to the inner ends of the forward gang frame members E, E' while they are in transport position they will turn pivotally upon their axes $e$, $e'$ and transmit rearward pressure to opposite sides of the rear main frame member B through the links 15 and 16. The member B will thereby be caused to recede from the forward main frame member A, and during this movement the reaches 17 and 18 connected with the forward main frame members C, C' will hold the inner ends of the rear gang frame members G and G' while the outer ends of the latter move rearward with the member B.

Figure 3:
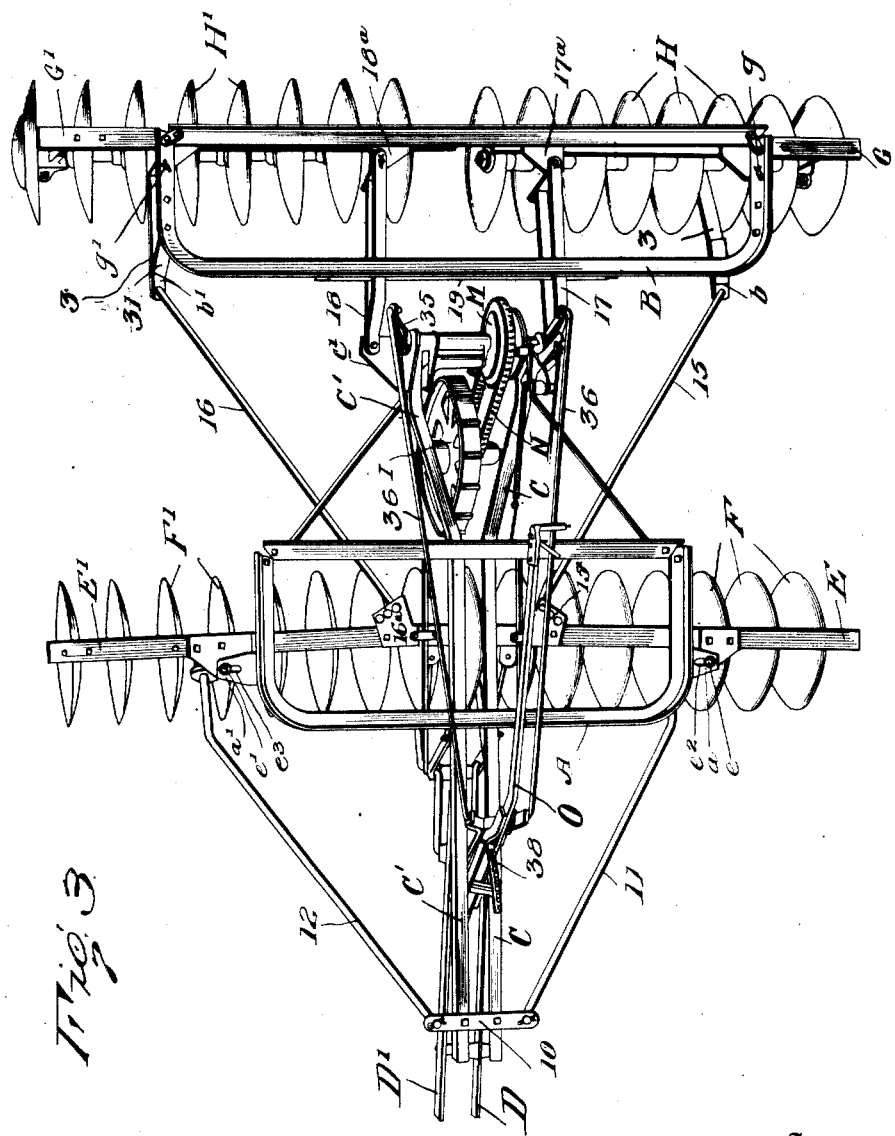
Fig. 3 is a perspective of the harrow, viewed from above, with the parts in transport position.
Figure 4:
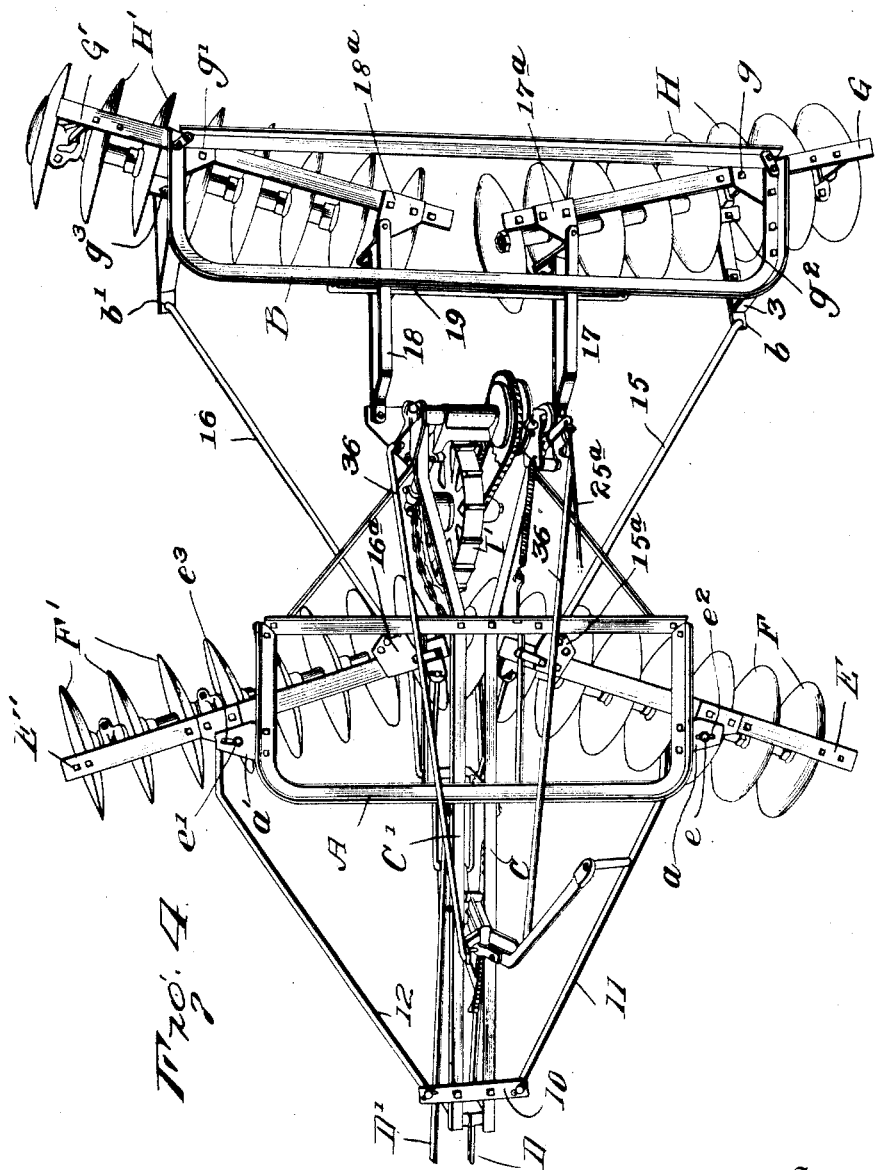
Fig. 4 is a view similar to Fig. 3 but with the parts in harrowing position.
Figure 5:
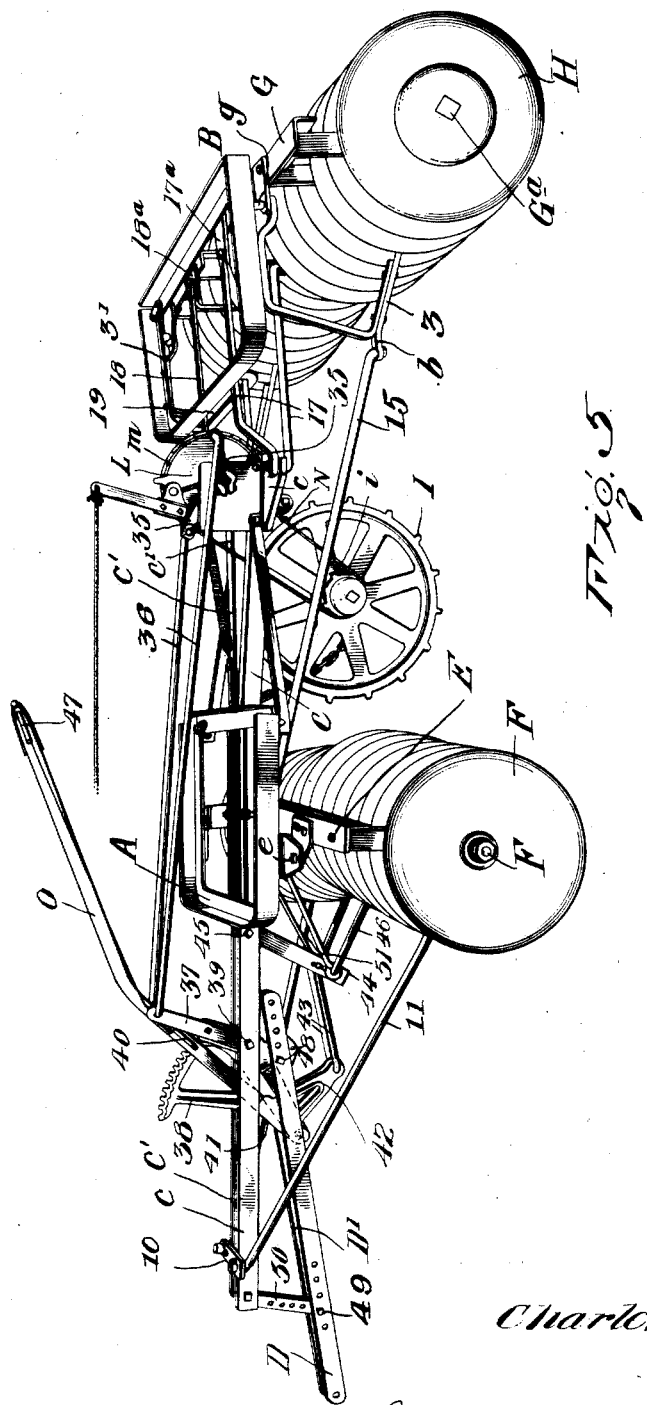
Fig. 5 is a view looking at the implement from one side, slightly in perspective, with the parts in transport position.
Figure 6:
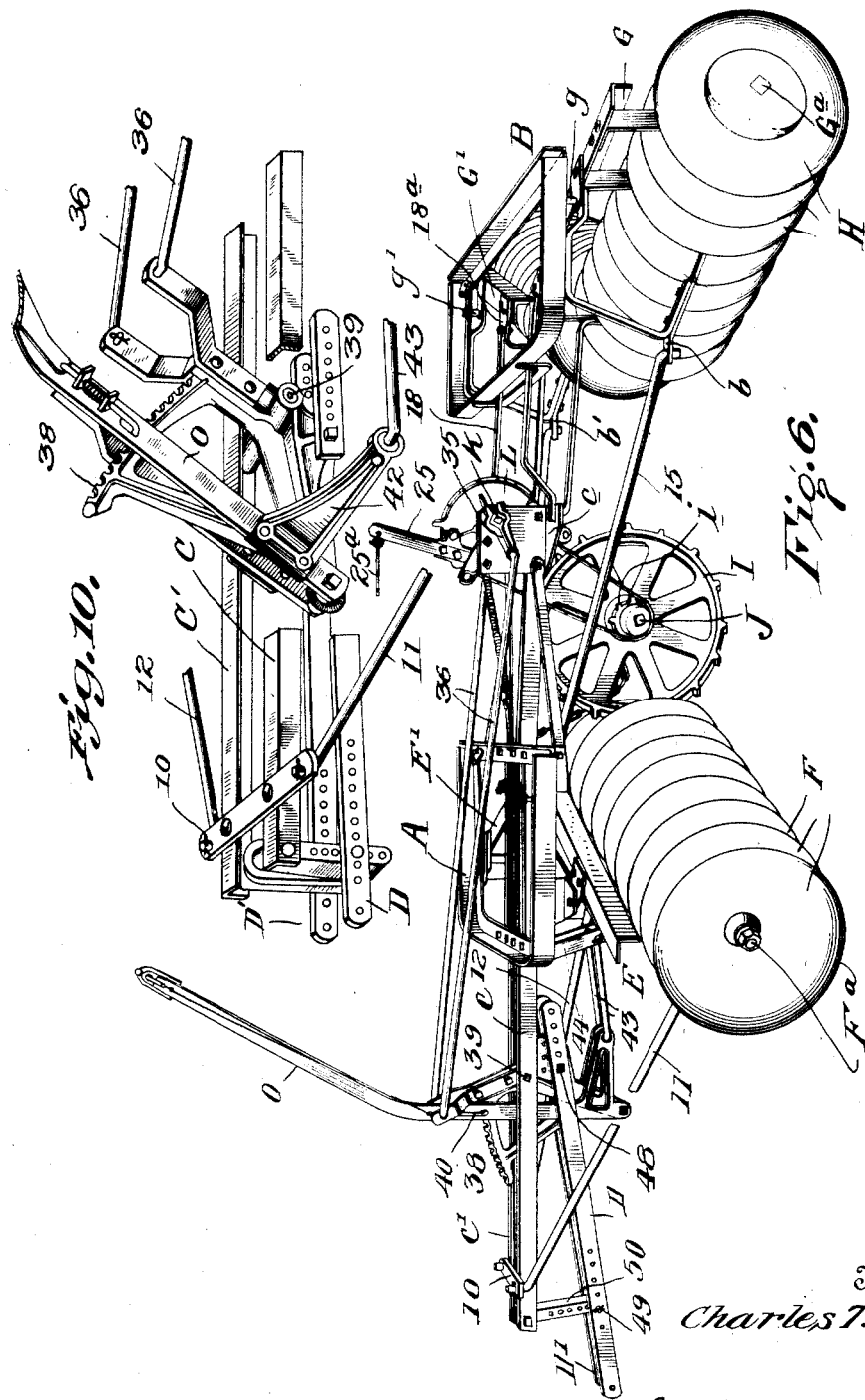
Fig. 6 is a view similar to Fig. 5, but with the parts in harrowing position.

The disks are thus forced into the working positions shown in Figs. 4 and 6. In the reverse movement to transport position (see Fig. 3 for example) force applied in a forward direction to the inner ends of the forward gang frame members E, E' will cause said members to move toward a position at right angles to the line of draft and in their said movements they will pull the rear main frame member B forward toward the front frame member A. The reaches 17 and 18 connected to the inner ends of the rear gang frame members G, G' will hold the inner ends of the latter while their outer ends are traveling forward with the rear main frame member B. The opening 19 through which the reaches extend, provide for the lateral movement of the rear member B and gangs H and H' which occurs while said member is advancing toward and receding from the front main frame member A, it being noted that the links 15 and 16 are more nearly parallel to the line of draft when the disks are in transport position than when they are in harrowing position. There is also a slight lateral movement of the forward gangs while they are being shifted, permitted by the slots in which the pivots $e$, $e'$ have their bearings. The provision of a plurality of openings in the corner plates $15^a$ and $16^a$ for the forward ends of the links provides for a preliminary adjustment of the angles of the latter to variably regulate the extent of diagonal movements which will be given the rear disk gangs relative to the front gangs.

As already stated, an important purpose of this invention is to accomplish this shifting of the gangs by power derived from the forward movement of the harrow, and reference has been made to a ground engaging member as an element of the shifting mechanism. This member in the illustrated embodiment of the invention is a wheel marked I. In this particular embodiment the wheel I is mounted to rotate upon a horizontal axis and is carried by the lower end of a crank arm J (see Fig. 7) whose upper end is secured in a bearing $j$ which is pivoted at $j'$ upon a shaft K, which extends across the space between the rear ends of the frame members C, C' and is supported by the latter. A clutch member L is fast upon one end of the shaft K and a clutch member M is normally loose on said shaft and is connected, preferably by a driving chain N and sprockets $m$ and $i$, with the wheel I. The sprocket $m$ is preferably formed as an integral part of the clutch member M and the sprocket $i$ is preferably integral with the hub of the wheel I.

Figure 7:
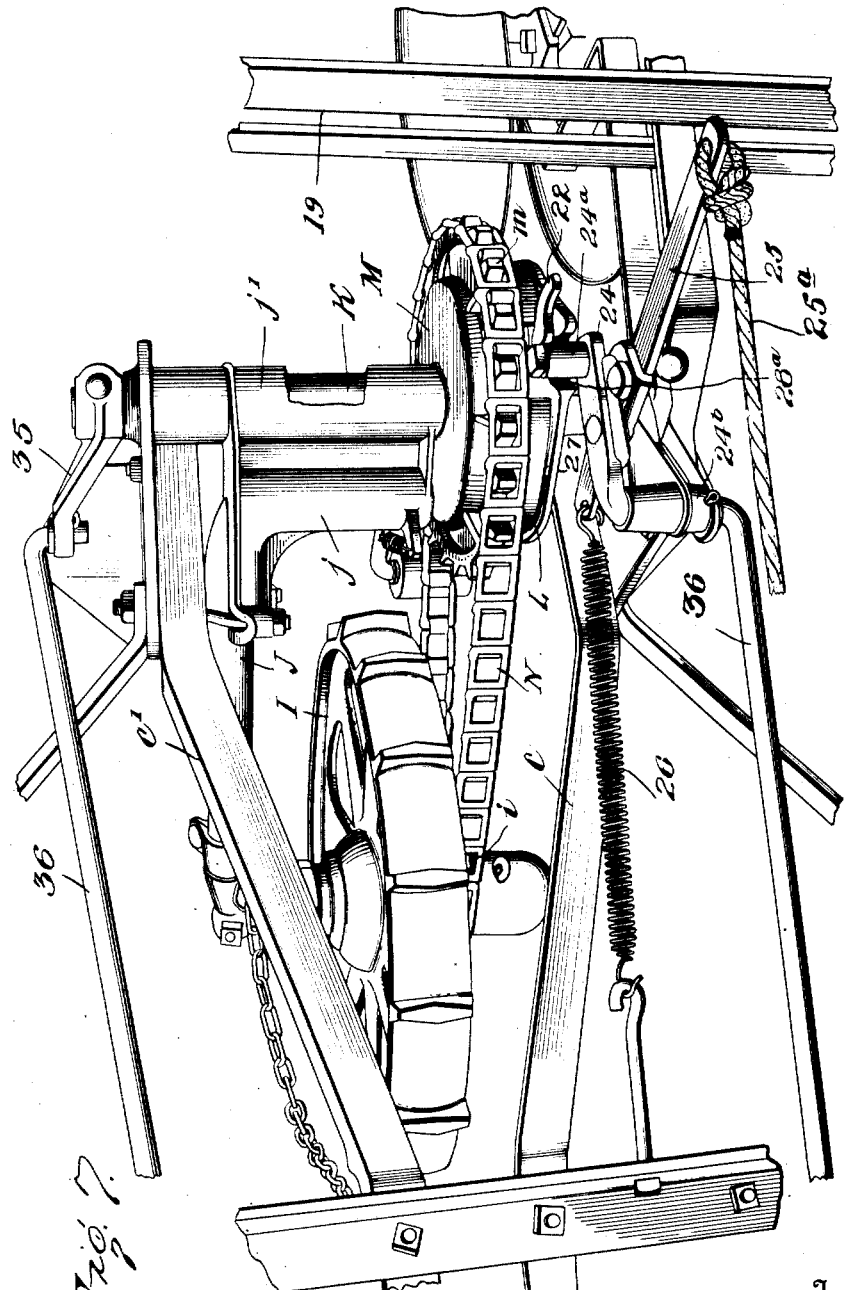
Fig. 7 is a detail view, in perspective, mainly intended to show the operating parts of the power lift mechanism.
Figure 8:
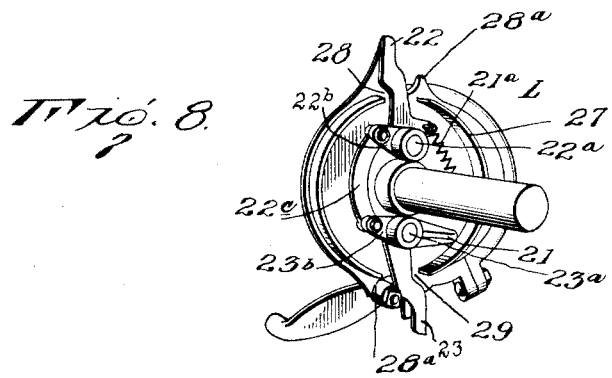
Fig. 8 is a detail view of one member of a clutch which may be employed as a part of said mechanism.
Figure 9:
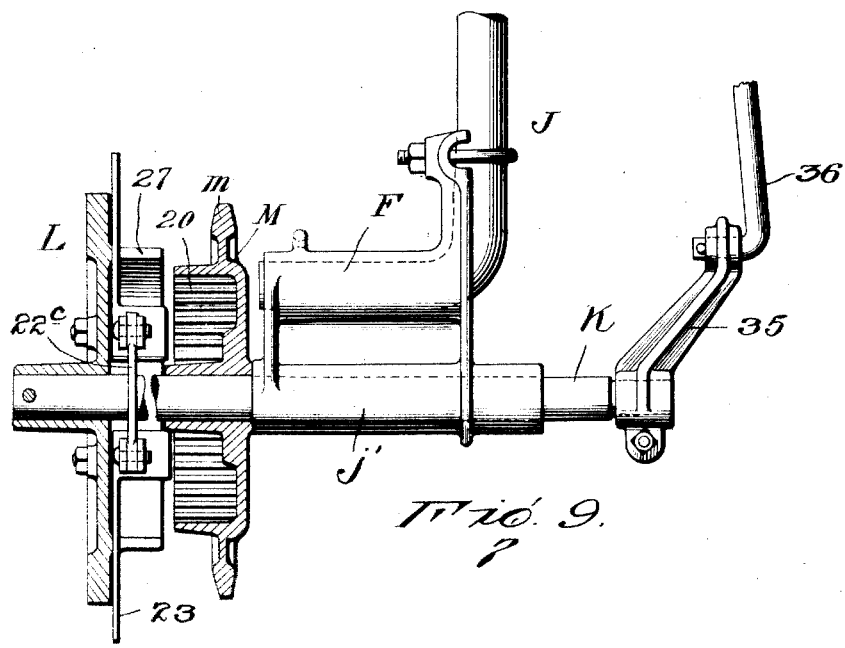
Fig. 9 is a detail sectional view showing both members of the clutch, slightly separated.

The members L and M are normally disconnected from each other, at which time the rotative movements of the member M derived from the travel of the wheel I over the ground is not transmitted to the shaft K. One suitable means for controllably connecting the member M to the member L to cause the shaft K to turn in its bearings, will now be described:

The member M is provided internally with teeth 20 (see Fig. 9) to be engaged by a dog 21 (Fig. 8) mounted in the clutch member L. $21^a$ designates a spring tending to engage the dog 21 with the teeth 20. This tendency is resisted at all times except when the shift is being made, by a dog-operating mechanism which preferably includes arms 22 and 23, projecting outwardly from the member L at opposite sides of the axis of the latter. These arms are pivoted at $22^a$ and $23^a$ and are provided with cranks $22^b$ and $23^b$ connected with each other by a link $22^c$. A latch 24 (Fig. 7), provided with a roller $24^a$ at one end, is pivoted at its other end, $24^b$, to a suitable fixed part of the implement and is connected between its ends to an operating lever 25, having a cord or other suitable actuator $25^a$ extending to within convenient reach of the operator on the tractor. The lever is also provided with a spring 26. As shown in Figs. 7 and 8, the member L has a circumferential flange 27 having high parts adjacent the openings 28 and 29 through which the arms 22 and 23 project, said high parts having recesses $28^a$.

In the normal operation of the implement, i. e. at all times except while the shift is being made from transport position to working position or from working position to transport position, the wheel I is free from any driving connection with the shaft K and said shaft is stationary in its bearing.

When however the shift is to be made, the operator upon the tractor pulls the cord 25ᵃ thereby disengaging the roller 24ᵃ, carried by latch 25, from the arm 22 or 23 with which it was engaged. The spring 21ᵃ now becomes effective to engage pawl 21 of the driven member L of the clutch with the teeth 20 of the driving member M of the clutch. When this has been done the operator releases the cord. The driven member L is now turned one-half revolution by the power derived from the travel of wheel I over the ground, transmitted to said driven member by the sprockets $i$ and $m$, chain N and driving member M; the roller 24ᵃ meanwhile traveling in the periphery of the clutch member L and, at about the end of the movement, engaging the other arm 22 or 23 and by reason of a slight further movement of the clutch member L acting upon said arm to disengage the pawl 21 from the teeth 20 of the member M and finally traveling into the adjacent opening or recess 28ᵃ. The parts remain in this position until a shift is again to be made, when the operation just described is repeated.

It will be apparent that in each of these shifting operations the arm J assumes a more nearly vertical position, or straightens up, from the forwardly and downwardly inclined position shown in Fig. 7. This is due to the correlation of the parts and the retardation of the lower end of the arm caused by the resistance of the ground imposed upon the ground engaging member carried by the lower end of said arm. The straightening of the arm lifts the frame and gangs as a whole and correspondingly reduces the power which otherwise would be required in the shifting of the gangs, since it correspondingly reduces, or eliminates, the resistance offered by the ground to the disks themselves in the shifting of the latter.

The ends of the shaft K are provided with cranks 35, connected by links 36, with upward projections 37 fixed to opposite sides of a quadrant 38. This quadrant is mounted between the forward ends of the frame members C, C′ and is pivoted thereto at 39. A hand lever O is provided with a latch 40 to engage the teeth of the quadrant, and has a bifurcated lower end 41 with rearward extensions 42 which are connected by links 43 with a member 44 pivoted to the main frame at 45 and provided with links 46 extending rearward therefrom to the inner ends of the axles Fᵃ, Fᵇ, respectively.

It will thus be seen that when the shaft K is turned one-half of a complete revolution the lever O and quadrant 38 will swing as a unit upon the pivot 39 and through the links 43, swinging member 44 and links 46 will press the forward gang axles Fᵃ, Fᵇ forward or pull them rearward, as the case may be, thus shifting the forward gangs. The rear gangs are shifted in synchronism therewith, as already set forth.

It will be noted that the lever O is adjustable relatively to the segment 38. The latch 40 for fixing it in adjusted position with relation to the segment may be of any suitable style and is provided with an actuating element 47 adjacent the handle of the lever. The purpose of the lever is to determine the degree of angle which the disk gangs will assume when shifted by the power mechanism. It will be noted that shifting of the lever at the points at which the shifting links 43 are connected to the lever nearer to or farther from the point 39 upon which the lever and quadrant are mounted thus changing the throw of said links.

Attention is called to the fact that the draw bars D′, D² are connected by a pivot bolt 48 to the quadrant 38 and at 49 to hangers 50 depending from the front ends of the main frame members C, C′. The draft is on the bolt 48 and is communicated through the quadrant 38 and links 43, member 44 and links 46 to the front axles Fᵃ and Fᵇ, and supplements the power of the wheel I and connections in shifting the gangs between working and transport positions.

51 are pivoted brace rods which extend from member 44 to the members E and E′ of the disk gang frames.

It will now be seen that I have provided a tractor drawn gang shifting mechanism which is operative by power derived from the forward movement of the harrow, as contradistinguished from relative movement of the tractor and harrow, to accomplish the shifting of the gangs: and, especially will it be noted, that the illustrated mechanism provides a very practicable means operative to shift the gangs in both directions—i. e. from transport position to working position and from working position back to transport position—by power derived from the forward movement of the harrow. It will also be seen that the means which I have illustrated possess other important advantages. With respect to the particular illustrated embodiment, it will be noted:

(1) That this shift is made in one and the other direction respectively by successive partial revolutions of an element forming a part of the shifting mechanism, the partial revolution being preferably a one-half revolution as shown. It will especially be noted that in the illustrated embodiment of the invention the shaft K and the connections between the shaft and the forward gangs are so co-ordinated that the shift will be made in one direction and the other, respectively, by successive half revolutions of the shaft and that these movements are transmitted to the shaft from the ground wheel which may be continuously rolling along the ground but is normally inoperative with relation to the shaft, the transmitting means comprising a clutch mechanism of suitable nature, one such being illustrated:

(2) The power is applied to one pair of gangs and is transmitted thence to a second pair of gangs through connections which cause the gangs of the latter pair to converge in a direction the reverse of that of the first mentioned pair:

(3) That while the connections by which power is applied to shift the gangs from transport position to working position and from working position back to transport position by the forward movement of the harrow includes members which move unitarily during such shifting operation, yet provision is made for a relative movement of said members in order that there may be brought about a particular setting of certain of the parts with relation to other parts of the connections to determine the extent of their unitary movement while they are being later shifted from transport position to working position, whereby the position of the gangs when shifted to working position by power derived from the movement of the harrow and applied to such connections may be predetermined.

(4) Power derived from the ground engaging member applied to the gang-shifting connections is supplemented by power applied to said connections by means of a traction member, or, in other words, through the means, (as the draw bars D', D² for example,) which connects the harrow to the means, as a tractor for example which draws the harrow.

Means, embodying the foregoing advantages, and other advantages apparent to those familiar with the invention, have been illustrated by the drawings and now fully set forth in the description, and it will be understood that while a very important part of the invention has relation to means for utilizing power derived from the travel of the harrow to effect the shifting of the gang or gangs, and that while the illustrated embodiment embraces elements co-ordinated to apply this power to the gangs in a beneficial way, nevertheless the illustrated embodiment is merely exemplary and, moreover, certain parts of the mechanism may be usefully employed in a harrow in which the shifting of the gang or gangs is effected through means which are operated humanly. It is the intention, therefore, that the appended claims be construed broadly, and that those claims which do not express, or imply the necessity of, connections operated by power derived from the travel of the harrow, be construed as applicable to a harrow the gang or gangs of which are shifted humanly.

Having thus described the invention, and set forth a preferred embodiment thereof in detail, what I believe to be new and desire to secure by Letters Patent and what I therefore claim is:—

1. In a disk harrow, a main frame, shiftable earth working disks and means including a ground engaging operating member separate from any of the earth working disks of the harrow, said means operative by the movement of the harrow to change the angle of the disks relative to the line of draft.

2. In a harrow, the combination of a harrow device, a non-harrowing device in contact with the ground and rotated thereby, and connections intermediate the non-harrowing device and said harrowing device for moving said harrow device by the non-harrowing device from one set position to another.

3. In a disk harrow, a main frame, shiftable earth working disks and means including a ground engaging operating member separate from any of the earth working disks of the harrow, said means operative by the forward movement of the harrow to shift the disks from transport to working position and from working position to transport position.

4. In a disk harrow, a main frame, shiftable earth working disks and means, including a ground engaging non harrowing member and connections operative by said member, to change the angle of the disks with relation to the line of draft by power derived from the movement of the harrow.

5. In a disk harrow, a main frame, a shiftable earth working disks and means, including a ground engaging non-harrowing member and connections operative by said member to shift the disks from transport position to working position and from working position back to transport position by power derived from the forward travel of the harrow.

6. In a disk harrow, a main frame, shiftable earth working disks and controllable means operative to vary the angle of the disks with relation to the line of draft, including a ground engaging non-harrowing member and co-operating connections normally inoperative to change the angle of the disks, and also including means operable at will to make said member operative through said connections to cause the angle of the disks with relation to the line of draft to be changed by power derived from the forward travel of the harrow.

7. In a disk harrow, a main frame, shiftable disks and controllable means operable to vary the angle of the disks with relation to the line of draft, including a ground engaging member and co-operating connections normally inoperative to change the angle of the disks and also including means operable at will to make said ground engaging member operative through said connections to shift the disks from transport position to working position and from working position back to transport by successive movements of the ground engaging member derived from forward travel of the harrow.

8. In a disk harrow having a gang of shiftable earth working disks; power operated mechanism having a definite cycle of movement, connections between the power operated mechanism and the gang operative to cause the gang to be moved from one position to another by one cycle of the movement of the power mechanism and to be moved from its latter position to its first position by the next cycle of the movement of the power mechanism 9. A gang shifting mechanism for disk harrows comprising a pivotally mounted ground engaging member, means to be operated by said member to shift the gang by power derived from the travel of the harrow, including a clutch whose driving and driven members are normally disengaged from each other, and means for connecting said members to each other, at will.

10. A disk harrow having power operated mechanism to move a gang of its earth working disks from one position to another and from the latter position back to the former by power derived from the travel of the harrow, said mechanism including a clutch having separate cycles of movement and operative during one of its cycles to move the gang from one of its positions to the other and by its next cycle to move the gang back to its first mentioned position.

11. A disk harrow having a gang of shiftable disks and mechanism for shifting said gang, the shifting mechanism including a ground wheel and means operated by the ground wheel to shift the gang by power derived from the travel of the harrow.

12. A disk harrow having a gang of shiftable disks and mechanism for shifting said gang, the shifting mechanism including a normally idle ground wheel, means to be operated by the ground wheel to shift the gang by power derived from the travel of the harrow, and means operable at will to make the ground wheel operable upon the first-mentioned means.

13. A disk harrow having a gang of shiftable disks and mechanism for shifting said gang including a ground wheel and connections between the ground wheel and the gang, the connections including means operable at will to cause the gangs to be shifted by power derived from the ground wheel.

14. A disk harrow comprising a shiftable disk gang, and mechanism for shifting the gang by power derived from the travel of the harrow, said mechanism including a pivotally mounted ground engaging member and connection between the same and the gang, the connection having means operable by successive movements to cause the gang to be shifted in one direction and the other respectively, and means for operatively connecting the first mentioned means with the ground engaging member.

15. A disk harrow comprising a shiftable disk gang, and mechanism for shifting the gang by power derived from the travel of the harrow, said mechanism including a continuously rotative ground wheel and connection between the ground wheel and the gang, the connection having means operable by successive movements to cause the gang to be shifted in one direction and the other, respectively, and means for operatively connecting the first mentioned means with the ground wheel, at will.

16. A disk harrow comprising a shiftable disk gang, and mechanism for shifting the gang by power derived from the travel of the harrow, said mechanism including a pivotally mounted ground engaging member and connections between the same and the gang, the connection having a clutch operable by successive movements to cause the gang to be shifted in one direction and the other respectively, and means for rendering the clutch operative, at will.

17. A disk harrow having a gang of shiftable disks and mechanism for shifting said gang by power derived from the travel of the harrow, including a continuously rotative ground wheel and connections between the ground wheel and the gang, the connections including a clutch operable by successive movements to cause the gang to be shifted in one direction and the other respectively, and means for rendering the clutch operative, at will.

18. A gang shifting mechanism for disk harrows comprising in combination with the gang of shiftable disks, connections thereto for shifting the same by power derived from the travel of the harrow including a member operable upon successive partial revolutions to shift the gang in one direction and the other respectively, and means operable at will to cause said member to shift the gang and to render it inoperative with relation to the shifting of the gang when the shift has been effected.

19. A disk harrow having a gang of shiftable disks and mechanism for shifting said gang by power derived from the travel of the harrow, including a pivotally mounted ground engaging member and connection between the same and the ground, the connection including a revoluble clutch operable upon a partial revolution thereof to cause the gang to be shifted in one direction and upon its next partial-revolution to cause the gang to be shifted in the opposite direction, and means for rendering the clutch operative, at will.

20. A disk harrow having a gang of shiftable disks and mechanism for shifting said gang, including a ground-engaging member, a clutch member, connections between the clutch member and ground member, a second clutch member, connections between the latter and the gang, said clutch members being normally disconnected, and means for operatively connecting them at will to thereby cause the shift to be made by power derived from the travel of the ground member.

21. A disk harrow having a gang of shiftable disks and mechanism for shifting said disks by power derived from the travel of the harrow, including a shaft, connections operated by the shaft to shift the gang, a ground-engaging member, a clutch member driven thereby, a second clutch member connected to the shaft, said clutch members being normally disconnected, and means for connecting them, at will.

22. A disk harrow having a gang of shiftable disks and mechanism for shifting the disks by power derived from the travel of the harrow, including a shaft, connections operable by successive partial revolutions of the shaft to shift the gang in one direction and the other respectively, a ground engaging member normally inoperative with relation to the shaft, and means for rendering the ground engaging member operative with relation to the shaft, at will.

23. A disk harrow having a gang of shiftable disks and mechanism for shifting the disks by power derived from the travel of the harrow, including a shaft, connections operable by successive partial revolutions of the shaft to shift the gang in one direction and the other respectively, a ground wheel, and connections between the wheel and shaft including a clutch having its driven and driving members normally disconnected and means operable at will to operatively connect its said members, and operating to disconnect them when the shift has been completed.

24. A disk harrow having a gang of shiftable disks and mechanism for shifting the disks by power derived from the travel of the harrow, including a shaft, connections operable by successive partial revolutions of the shaft to shift the gang in one direction and the other, respectively, a ground wheel, a sprocket wheel revoluble therewith, a clutch member having a sprocket wheel, a sprocket chain connecting the sprocket wheels to transmit movement from the ground wheel to the clutch member, a second clutch member connected to the shaft, and means operable, at will, to operatively connect the clutch members to each other to cause the shift to be made, and operating to disconnect them from each other when the shift has been made.

25. A disk harrow having a gang of shiftable disks and mechanism for shifting the disks by power derived from the travel of the harrow, including a shaft, connections operable by successive partial revolutions of the shaft to shift the gang in one direction and the other, respectively, a crank arm having a bearing at its upper end pivotally mounted on the shaft, and provided at its lower end with a spindle, a ground wheel revoluble upon the spindle, a clutch member fast with relation to the shaft, a second clutch member loose with relation to the shaft, a driving chain and sprockets transmitting movement from the wheel to the latter clutch member, and means operable at will to operatively connect the clutch members to each other to cause the shift to be made and operating to disconnect them from each other when the shift has been made.

26. In a disk harrow the combination with the frame, a shiftable disk carrier connected to the frame and a gang of earth working disks supported by said carrier and shiftable therewith, of an optionally acting non-harrowing ground engaging power device and means co-operating with said power device and connected to said carrier to shift the carrier by power derived from travel of the harrow.

27. In a disk harrow the combination with a frame, a shiftable disk carrier connected to the frame and a gang of earth working disks supported by the carrier and shiftable therewith, of an optionally acting non-harrowing ground engaging wheel and means co-operating with said wheel and connected to said carrier to shift the carrier by power derived from travel of the harrow.

28. In a disk harrow the combination with a frame, a shiftable disk carrier connected to the frame and a gang of earth working disks supported by the carrier and shiftable therewith; of a member normally inclined with relation to the frame and provided with a ground engaging element, and optionally acting power connections which when in operation causes said member to assume a more nearly upright position thereby correspondingly lifting the frame and disks and also causes the ground engaging element to become effective to operate the connections.

29. In a disk harrow the combination with a frame, a shiftable disk carrier connected to the frame and a gang of earth working disks supported by the carrier and shiftable therewith, of a member normally inclined with relation to the frame and provided with a ground engaging wheel and optionally acting power connections which when in operation causes said member to assume a more nearly upright position thereby correspondingly lifting the frame and disks and also causes the ground engaging wheel to become effective to operate the connections.

30. In a disk harrow, the combination with a frame, a shiftable disk carrier connected to the frame and a gang of earth working disks supported by the carrier and shiftable therewith, of a member normally inclined with relation to the frame and having its upper end pivotally connected therewith, a normally idle wheel carried by the lower end of said member, and optionally acting connections between said wheel and carrier, said frame, connections, wheel and member correlated to cause the member to assume a more nearly upright position when the wheel and connections are brought into power transmitting relation.

31. In a harrow, the combination of a harrow device, means for setting said harrow device and means for moving said harrow device from its set position independently of said setting means.

32. In a harrow, the combination of a harrow device, means for setting said harrow device, means for moving said harrow device from its set position and restoring it to its set position, the adjustment of the setting means being maintained during said movement.

33. In a harrow, the combination of a frame, a harrow device mounted on the frame, manual means for setting said device with relation to the frame, a non-harrowing wheel in contact with the ground and rotated thereby upon movement of the harrow, and connections intermediate said wheel and said harrow device for moving the latter from its set position without affecting the adjustment of the manual means.

34. A harrow comprising, in combination, a shiftable gang of disks and means connected thereto to shift the same from transport position to working position and from working position to transport position, by power derived from the travel of the harrow, including a lever and a pivoted quadrant which move unitarily in such shifting of the gang and are relatively adjustable to predetermine the position of the gang when shifted.

35. A harrow comprising, in combination, a shiftable gang of disks and means to shift the same, including a ground engaging member and means connecting the ground engaging member and the gang to shift the latter from transport position to working position and from working position to transport position by power derived from the travel of the harrow, the connecting means having members which move unitarily in such shifting operation and are relatively adjustable to predetermine the position of the gang when shifted.

36. A harrow comprising, in combination, a shiftable gang of disks, a ground engaging member, a pivoted quadrant, a lever having pivotal connection with the quadrant and adjustable relatively thereto, means for fixing the lever in adjusted position to the quadrant, means connecting the lever to the gang and connections between the ground engaging member and the quadrant.

37. A harrow comprising, in combination, a shiftable gang of disks, a pivoted quadrant, a lever having pivotal connection with the quadrant and adjustable relatively thereto, means for fixing the lever to the quadrant in adjusted position, means connecting the lever to the gang, a shifting connection operating on the quadrant, a ground engaging member for operating said connection, normally inoperative with relation thereto, and means operable at will to render the ground engaging member operable upon the connection to transmit movement to the quadrant to thereby shift the gang by power derived from the travel of the harrow.

38. A harrow comprising, in combination, a shiftable gang of disks, a pivoted quadrant, a lever having pivotal connection with the quadrant and adjustable relatively thereto, means for fixing the lever to the quadrant in adjusted position, means connecting the lever to the gang, a revoluble member, means operable upon a partial revolution of said member to shift the quadrant, a ground engaging member, normally inoperative with relation to the revoluble member, and means operative at will to transmit movement from the ground engaging member to the revoluble member and operating to disconnect the ground engaging member from the revoluble member when the latter has completed the partial revolution which results in the shifting of the gang.

39. A harrow comprising, in combination, a shiftable gang of disks, a pivoted quadrant, a lever having pivotal connection with the quadrant and adjustable relatively thereto, means for fixing the lever to the quadrant in adjusted position, means connecting the lever to the gang, a shaft having a crank, a link connecting the shaft to the quadrant, a ground engaging member normally inoperative with relation to the shaft, and means for operatively connecting the ground engaging member to the shaft, at will.

40. A harrow comprising, in combination, a shiftable gang of disks, a pivoted quadrant, a lever having pivotal connection with the quadrant and adjustable relatively thereto, means for fixing the lever to the quadrant in adjusted position, means connecting the lever to the gang, a revoluble shaft having a crank, a link connecting the shaft to the quadrant, a ground engaging member normally inoperative with relation to the shaft, and a clutch mechanism having its driven member fixed to the shaft and its driving member connected to the ground engaging member, the clutch mechanism including means operable at will to connect its driving and driven members to each other and to disconnect them from each other when they have completed a partial revolution sufficient to accomplish the desired shift of the gang.

41. A disk harrow having a gang of shiftable disks and mechanism for shifting said disks by power derived from the travel of the harrow, including a shaft, connections operated by the shaft to shift the gangs, a clutch normally inoperative with relation to the shaft and which when operably connected to the shaft is operable by successive half revolutions to operate the shaft to shift the gang in one direction and the other respectively, means for rendering the clutch operative with relation to the shift at will, a ground wheel, and connections between the ground wheel and one member of the clutch.

42. A harrow comprising, in combination a frame, a set of shiftable gangs of disks, a pivoted quadrant, a lever carried by the quadrant and adjustable relatively thereto and having means for fixing it in its adjusted position to the quadrant, a pivoted member depending from the frame, links connecting the lever to the depending member, and links connecting the depending member to the set of gangs.

43. A disk harrow having a gang of shiftable disks and mechanism for shifting said disks by power derived from the travel of the harrow, comprising a ground engaging member, means operable by the ground engaging member to shift the gang, and a traction member connected to the means and supplementing the action of the ground engaging member.

44. A disk harrow having a gang of shiftable disks and mechanism for shifting said disks by power derived from the travel of the harrow, including a pivoted quadrant, a lever having pivotal connection with the quadrant, connections between the lever and the gang, a ground engaging member, connections between the quadrant and the ground engaging member and a traction member also connected to the quadrant.

45. A harrow comprising, in combination, a frame having a depending member, a gang of disks pivotally connected to the frame to be shiftable with relation thereto in a substantially vertical axis, a quadrant pivotally connected with the frame, a lever movable pivotally relatively to the quadrant, means for fixing the lever and quadrant together in selected positions for unitary movement, means connecting the lever to the disk gang, a ground engaging member, means operable at will for transmitting power from the ground engaging member to the lever to shift the disk gang, and a traction member connected to the quadrant to aid in the shifting of the gang.

46. In a disk harrow having a frame and a disk gang movable relatively to the frame; mechanism operative by power derived from the forward travel of the implement and including a means having definite cycles of movement to shift the gang from transport to working position and from working position to transport position, respectively, and means to predeterminedly set the gang to determine the position it will take when angled by the power mechanism.

47. A disk harrow having a plurality of gangs of shiftable disks and connections between them to shift one gang by power applied to the other, in combination with means to apply said power by motion derived from a ground engaging member of the harrow which member is separate from any of the disks.

48. A disk harrow having a plurality of gangs of shiftable disks and connections between them to shift one gang by power applied to the other in combination with means operative by motion derived from forward movement of a ground engaging member of the harrow to apply to one gang the power which shifts both gangs from transport position to working position and from working position back to transport position.

49. In a harrow, the combination of a plurality of harrow devices and non-harrowing means actuated independently of the harrow devices and by movement of the harrow, for moving said harrow devices from one position to another.

50. In a harrow, the combination of a plurality of harrow devices, non-harrowing means, actuated independently of said harrow devices and by movement of the harrow, for moving said harrow devices from one position to another and returning them to the first position, and a manual device for controlling said means.

51. In a harrow, the combination of a plurality of harrow devices, manual means for setting said harrow devices, and means actuated independently of any harrow device, for automatically moving the harrow devices from their set position and restoring them to their set position, the adjustment of the setting means being maintained during said movements.

52. A disk harrow having, in combination, a plurality of gangs of shiftable disks and means for shifting them simultaneously by power derived from the travel of the harrow, including operating connections to the gangs and a pivotally mounted ground engaging member separate from any of said disks and common to the connections and normally inoperative with relation thereto and means for making it operative at will.

53. A disk harrow having, in combination, a plurality of sets of gangs of shiftable disks, a pivotally mounted ground engaging member, connections operative at will by said ground engaging member to shift one set of said gangs, and connections between the sets of gangs to cause one set to be shifted from the other.

54. A disk harrow having, in combination, a front set and a rear set of gangs of earth working disks, a ground engaging member, connections operative at will by said ground engaging member to shift one set of said gangs, and interrelated connections between the sets of gangs to cause power applied to one set to be transmitted to the other to change the angular relation of the gangs with respect to each other and to the line of travel of the harrow.

55. A disk harrow having, in combination, a plurality of sets of gangs of shiftable disks, a pivotally mounted ground engaging member, connections operative at will by said ground engaging member to change the angular relation of the gangs of one set with respect to each other and to the line of travel of the harrow, and connections between one of said sets of gangs and the other set of gangs to change the angular relation of the gangs of the latter with respect to each other and to the line of travel of the harrow by power transmitted from the first-mentioned pair.

56. A disk harrow having, in combination, a plurality of shiftable disk gangs, connections whereby one is shifted by power transmitted from the other, and mechanism for applying power derived from the travel of the harrow to the latter gang to shift the same, including a pivotally mounted ground engaging member and means connecting the same to the gang to which the power is to be applied, the connection having a clutch operable by successive partial revolutions to cause the gang to be shifted in one direction and the other, respectively, the members of the clutch being normally disengaged and means for operatively engaging them at will to cause the shift to be made and to disengage them from each other when the shift has been made.

57. In a disk harrow, a plurality of shiftable gangs of earth working disks, in combination with a power operated mechanism which includes a clutch having separate cycles of movement, a connection between said clutch and one of the gangs and a connection from one gang to the other, said clutch and connections co-operating to cause power to be applied to one gang and transmitted thence to the other gang and to cause the power applied in one cycle of movement of the clutch to be such as to shift the gangs from one position to another and the power applied in the next cycle of movement of the clutch to shift the gangs back to their first position.

58. A disk harrow having, in combination, a plurality of sets of gang disks, a pivotally mounted ground engaging member, connections operable at will by said ground engaging member to apply power to one set of gangs to shift the same, including an adjusting lever which is adjustable relatively to other elements of the connections and has means for fixing it in selected position for movement with the other elements, and connections between the sets of gang disks to cause them to be shifted together.

59. A disk harrow having, in combination, a plurality of sets of gang disks, a pivotally mounted ground engaging member, connections operable at will by said ground engaging member to apply power to one set of gangs to shift the same, including an adjusting lever which is adjustable relatively to other elements of the connections and has means for fixing it in selected position for movement with the other elements, and interrelated connections between the sets of gangs to cause power applied to one set to be transmitted to the other to shift the angular relation of the gangs with respect to each other and to the line of travel of the harrow.

60. A disk harrow having, in combination, a plurality of sets of disks, a pivotally mounted ground engaging member, connections operable at will by said ground engaging member to apply power to one set of gangs to shift the same, including an adjusting lever which is adjustable relatively to other elements of the connections and has means for fixing it in selected position for movement with the other elements, and interrelated connections between the sets of gangs to cause power applied to one set to be transmitted to the other, said connections including relatively movable frame members to which the respective sets of gangs are pivotally connected and elements connecting the gangs of each set with the frame member of the other set.

61. A disk harrow having, in combination, a plurality of sets of disks, a pivotally mounted ground engaging member, connections operable at will by said ground engaging member to apply power to one set of disks to shift the same, including an adjusting lever which is adjustable relatively to other elements of the connections and has means for fixing it in selected position for movement with the other elements, and interrelated connections between the sets of disks to cause power applied to one set to be transmitted to the other, said connections including relatively movable frame members to which the respective sets of disks are pivotally connected and elements connecting the disks of each set with the frame member of the other set and elements connecting the portions of the disks of each set between the pivots and inner ends of the disks with the frame member of the other set of disks.

62. A disk harrow having, in combination, a first and a second set of shiftable disks, a pivotally mounted ground engaging member, connections operable at will by said ground engaging member to shift the first set of disks, and connections between the latter set of disks and the second set to hold one end of each of the second set while permitting the other end thereof to move with the first set.

63. A disk harrow having, in combination, a main frame including a front member and a rear member, one of which is movable toward and away from the other, two sets of gangs of disks, one set pivotally connected to the front member of the frame and the other set pivotally connected to the rear member of the frame, means connecting the front gangs to the rear frame member, means connecting the rear gangs to the front frame member, a pivotally mounted ground engaging member, and means operable at will to transmit power from said member to one set of gangs, whereby both sets are shifted by power derived from the travel of the harrow.

64. A disk harrow having, in combination, a main frame including a front member and a rear member, one of which is movable toward and away from the other, two sets of gangs of disks, one set pivotally connected in the outer half of their lengths, respectively, to the front frame member and the other set pivotally connected in the outer half of their lengths, respectively, to the rear frame member, pivotal connections between the inner half of the length of each gang of each set and the frame member to which the other set is connected, a pivotally mounted ground engaging member, and means operable at will to transmit power from said member to one set of gangs, whereby the angular relation of the gangs of each set with respect to each other and of both sets with respect to the line of draft is changed by power derived from the travel of the harrow.

65. A disk harrow having a plurality of gangs of shiftable disks and connections between them to transmit to one gang power applied to the other, in combination with means for applying to the latter gang power derived from the travel of the harrow to shift the gangs, including an adjusting lever and means for fixing the lever in its selected position.

66. A disk harrow having a plurality of gangs of shiftable disks and interrelated connections between them to transmit to one gang power applied to the other, to shift one gang from the other, in combination with an adjusting lever, power transmitting connections between the lever and one gang including means for holding the lever in selected position, and means for applying to the lever power derived from the travel of the harrow.

67. A disk harrow having a plurality of gangs of shiftable disks and connections between them to transmit to one gang power applied to shift the other, in combination with an adjusting lever, power transmitting connections between the lever and one gang, including means for holding the lever in selected position, a pivotally mounted ground engaging member and power transmitting means connecting said member to the lever.

68. A disk harrow having a plurality of gangs of shiftable disks and connections between them to transmit to one gang power applied to shift the other, in combination with an adjusting lever, power transmitting connections between the lever and one gang, including means for holding the lever in selected position, and means for applying to the lever power derived from the travel of the harrow to shift the gangs, including a traction member and a pivotally mounted ground engaging member each having connection with the lever.

69. A disk harrow having a plurality of gangs of shiftable disks and connections between them to transmit to one gang power applied to shift the other, in combination with means to shift the latter gang, including an adjusting lever, a pivoted segment, the lever and segment being relatively adjustable, and means for fixing them to each other in selected positions for unitary movement.

70. A disk harrow having a plurality of gangs of shiftable disks and connections between them to transmit to one gang power applied to shift the other, in combination with means to shift the latter gang by power derived from the travel of the harrow, including a pivotally mounted ground engaging member, an adjusting lever, a pivoted segment, the lever and segment being relatively adjustable and means for fixing them in selected position for unitary movement.

71. A disk harrow having a plurality of gangs of shiftable disks and connections between them to transmit to one gang power applied to shift the other, in combination with means for applying to the latter gang power derived from the travel of the harrow, and a traction member separate from any of said disks and having connection with said means to operate the latter.

72. A disk harrow having a plurality of gangs of shiftable disks and connections between them to transmit to one gang power applied to shift the other, in combination with a ground engaging member, means operated thereby to apply to the latter gang power derived from the travel of the harrow, and a traction member connected to said means and supplementing the power transmitted from the ground engaging member.

73. A disk harrow having, in combination, a plurality of shiftable disk gangs, connections whereby one is shifted by power transmitted from the other, and mechanism for applying power derived from the travel of the harrow to the latter gang to shift the same, including a pivotally mounted ground engaging member and means connecting the same to the gang to which the power is to be applied, the connection having a means operable by successive movements to cause the gang to be shifted in one direction and the other, respectively, and means for operatively connecting the first mentioned means with the ground engaging member, at will.

74. A disk harrow, comprising a frame, a front gang of earth working disks having pivotal connection with the frame, a rear gang of such disks also having pivotal connection with the frame and power operated mechanism to shift the gangs from transport to working position and from working position to transport position by power derived from forward travel of the implement, including means having definite cycles of movements for effecting said shifting operations, respectively, said means applying power to one of the gangs, and a connection between the inner end of one gang and the outer end of the other gang to transmit to one the power applied to the other.

75. A disk harrow comprising a plurality of side by side gangs of shiftable earth working disks, and optionally acting power operated mechanism to shift the gangs between transport and working positions by power derived from the travel of the implement, including reciprocating connections by which the front gangs are caused to move in unison.

76. In a disk harrow having front and rear gangs of earth working disks: mechanism operative by power derived from the travel of the implement and including an adjusting lever operative to predetermine the angle the disks shall take and connections between said lever and the gangs, said mechanism also including a ground engaging operating means and connections between said means and the lever.

77. A tandem disk harrow having a front pair of gangs, a rear pair of gangs, connections between the gangs, power operated mechanism having a definite cycle of movement, connections between the power operated mechanism and the gangs adjustable so that movement of the power operated mechanism will move the gangs to different working angles and to different angles relative to one another if desired, said connections being such that, in the next cycle of movement of the power operated mechanism, the gangs will all be returned to their initial transport position regardless of the angles to which they may have been moved.

78. A harrow comprising, in combination, a shiftable gang of disks, a pivoted quadrant, a lever carried by the quadrant, means connecting the lever to the gang to transmit movement from the lever to the gang, said lever and quadrant being relatively adjustable and means for fixing them to each other for unitary movement.

79. A harrow comprising, in combination, a gang of shiftable disks and mechanism for shifting said gang, including a traction member and connections between the traction member and the gang, comprising a plurality of members which operate as a unit in the transmission of power from the traction member to the gang and are relatively adjustable to predeterminedly set the gangs, and means for fixing the members to each other for their said unitary movement.

80. A harrow comprising, in combination, a gang of shiftable disks, a pivoted lever, a pivoted quadrant, means connecting the lever to the gang, means for fixing the lever to the quadrant in any one of a plurality of selected positions, and a traction member connected to the quadrant.

81. A harrow comprising, in combination, a frame having a depending member, a gang of disks pivotally connected to the frame to be shiftable with relation thereto on a substantially vertical axis, a quadrant pivotally connected with the frame, a lever movable pivotally relatively to the quadrant, means for fixing the lever and quadrant together in selected positions for unitary movement, means connecting the lever to the disk gang, and a traction member connected to the quadrant.

82. In a harrow, the combination of a frame, a harrow device mounted thereon, a non-harrowing wheel in contact with the ground, and connections, including a manually controlled clutch, between said harrow device and said wheel for moving the harrow device relative to the frame.

83. In a harrow, the combination of a plurality of harrow devices and non-harrowing means, actuated independently of said harrow devices and by movement of the harrow, for moving said harrow devices from one position to another and returning them to the first position.

84. In a harrow, the combination of a harrow device, a non-harrowing device in contact with the ground and rotated thereby, connections intermediate said non-harrowing device and said harrow device for moving said harrow device by said non-harrowing device from one set position to another, and manual means for controlling said connections.

85. In a harrow, the combination of a plurality of harrow devices, manual means for setting said harrow devices, and means actuated independently of any harrow device, for automatically moving the harrow devices from their set position and restoring them to their set position, the adjustment of the setting means being maintained during said movements.

86. In a harrow, the combination of a harrow device, means for setting the same, a non-harrowing device in contact with the ground and rotated thereby, and connections between said harrow device and said non-harrowing device for automatically moving the harrow device from its set position, the adjustment of the setting means being maintained during such movement.

87. In a harrow, the combination of a harrow device, means for setting the same, a non-harrowing device in contact with the ground and rotated thereby, and connections between said harrow device and said non-harrowing device for automatically moving the harrow device from its set position and restoring it to its set position, the adjustment of the setting means being maintained during such movement.

88. In a harrow, the combination of a frame, a harrow device mounted thereon, a non-harrowing wheel in contact with the ground, and connections between said harrow device and said wheel through which the wheel moves the harrow device relative to the frame.

89. In a harrow, the combination of a frame, a harrow device mounted on the frame, manual means for setting said device with relation to the frame, a non-harrowing wheel in contact with the ground and rotated thereby upon movement of the harrow, and connections, including a manually controlled clutch, intermediate said wheel and said harrow device for moving the latter from its set position without affecting the adjustment of the manual means.

90. In a harrow, the combination of a frame, a harrow device mounted thereon, a structure pivoted to one end of said frame, a non-harrowing wheel in contact with the ground and mounted on said pivoted structure, and connections between said harrow devices and said wheel through which the wheel moves the harrow device relative to the frame.

91. In a harrow, the combination of a frame, a harrow device mounted thereon, a structure pivoted to one end of said frame, a non-harrowing wheel in contact with the ground and mounted on said pivoted structure to support one end of the frame, and connections between said harrow device and said wheel through which the wheel moves the harrow device relative to the frame from one position to another and back to the first position.

92. In a harrow, the combination of a frame, a structure pivoted thereon, a harrow device mounted on the frame, manual means for setting said harrow device with relation to the frame, a non-harrowing wheel in contact with the ground and mounted on said pivoted structure to support one end of the frame, and connections between said harrow device and said wheel through which the wheel moves the harrow device relative to the frame from one position to another and back to the first position without affecting adjustment of the manual means.

93. In a harrow, the combination of two frames, one back of the other, a set of harrow devices pivoted to the front frame, a set of harrow devices pivoted to the rear frame, manual devices mounted on the front frame for setting the harrow devices pivoted to the front and rear frames, and automatic means for moving said manual devices to move the harrow devices of both sets from their set positions.

94. In a harrow, the combination of two frames, one in the rear of the other, a set of harrow devices pivoted to the front frame, a set of harrow devices pivoted to the rear frame, manual devices mounted on the front frame for setting the harrow devices pivoted to both the front and rear frames, and automatic means for moving said manual devices to move the harrow devices of both sets from their set positions and restore them to their set positions.

95. In a harrow, the combination of two frames, one in the rear of the other, a set of harrow devices pivoted to the front frame, a set of harrow devices pivoted to the rear frame, manual devices mounted on the front frame for setting the harrow devices, pivoted to the front and rear frames, and automatic means comprising a non-harrowing wheel in contact with the ground, a manually controlled clutch and connections for moving said manual devices to move the harrow devices of both sets from their set positions and restore them to their set positions.

96. In a harrow, the combination of a harrow device, means for setting said harrow device and means for moving said harrow device from its set position, the adjustment of the setting means being maintained during said movement.

97. In a harrow, the combination of oppositely arranged harrow devices, means for setting said harrow devices, means for moving said harrow devices from their set position, the adjustment of said setting means being maintained during said movement.

98. In a harrow, the combination of a plurality of sets of harrow devices, one set being arranged in rear of the other, means for setting said sets of harrow devices, and means for moving said sets from their set position, the adjustment of said setting means being maintained during said movement.

99. In a harrow, the combination of oppositely arranged harrow devices, means for setting said harrow devices, means for moving and restoring said harrow devices from their set position, the adjustment of said setting means being maintained during said movement.

100. In a harrow, the combination of a harrow device, means for setting said harrow device, and automatic means for moving said harrow device from its set position, the adjustment of the setting means being maintained during said movement.

101. In a harrow, the combination of a harrow device, means for setting said harrow device, automatic means for moving said harrow device from its set position and restoring it to its set position, the adjustment of the setting means being maintained during said movement.

102. In a harrow, the combination of oppositely arranged harrow devices, means for setting said harrow devices, automatic means for moving said harrow devices from their set position, the adjustment of said setting means being maintained during said movement.

103. In a harrow, the combination of a plurality of sets of harrow devices, one set being arranged in rear of the other, means for setting said sets of harrow devices, and automatic means for moving said sets from their set position, the adjustment of said setting means being maintained during said movement.

104. In a harrow, the combination of a plurality of sets of pivoted harrow sections, one set being arranged in rear of the other, means for setting said harrow sections and automatic means for moving said sections in unison with each other, the adjustment of the setting means being maintained during said movement.

105. In a harrow, the combination of a plurality of sets of pivoted harrow sections, one set being arranged in rear of the other, means for setting said harrow sections and automatic means for moving said sections in unison with each other, and restoring same to their original position, the adjustment of the setting means being maintained during said movement.

106. In a harrow, the combination of a plurality of sets of pivoted harrow sections, one set being arranged in rear of the other, means for setting said harrow sections, said means co-operating to move the inner ends of said harrow sections and automatic means for moving said ends relatively to each other, the adjustment of the setting means being maintained during said movement.

107. In a harrow, the combination of a plurality of sets of pivoted harrow sections, one set being arranged in rear of the other, means for setting said harrow sections, said means co-operating to move the inner ends of said harrow sections and automatic means for moving said ends relatively to each other, and restoring said ends to their original position, the adjustment of the setting means being maintained during said movement.

108. In a harrow, the combination of a plurality of sets of pivoted harrow sections, means for setting one of said harrow sets, said means including a lever mechanism, means for moving said harrow set from its set position, said means including a clutch for actuating said lever mechanism.

109. In a disk harrow having a gang of earth working disks, means to shift the disks from and into ground working position including a clutch having definite cycles of movement and connections operative through said clutch to shift the gang to working position by one cycle of the movement of the clutch and to restore it to its former position by a succeeding cycle of the movement of the clutch.

110. The combination with a frame and a movable disk carrier, of an optionally acting clutch having definite cycles of movement, means operative through said clutch to shift the disk carrier in one direction and the other respectively by successive cycles of the movement of said clutch and by power derived from the forward travel of the harrow.

111. The combination with a frame and a movable disk carrier, of mechanism to shift the carrier by power derived from forward travel of the harrow, including an optionally acting clutch having definite cycles of movement and connecting means operative by said clutch and operating to shift the carrier in one direction by one cycle of the movement of the clutch and to restore it to its former position by a succeeding cycle of the movement of the clutch.

112. In a disk harrow having a frame and a gang of earth working disks, the combination with said disks of means to vary the angle of the same with relation to the line of draft by power derived from the motion of the harrow, said means including a pendent member having pivotal connection with the frame, optionally controlled controlling means to change the angle of inclination of said member with relation to the frame and ground, a ground engaging device carried by said member and connections operative when said member and device have been adjusted to one of their positions to change the angle of the disks.

In testimony whereof I affix my signature.

CHARLES T. RAY.